March 22, 1955 B. R. CLAY 2,704,829

DELAY LINE

Filed Oct. 1, 1951

INVENTOR
Burton R. Clay
BY J. L. Whittaker
ATTORNEY

United States Patent Office 2,704,829

Patented Mar. 22, 1955

2,704,829

DELAY LINE

Burton R. Clay, Woodbury, N. J., assignor to Radio Corporation of America, a corporation of Delaware Application October 1, 1951, Serial No. 249,197

4 Claims. (Cl. 333—31)

Figure 1:
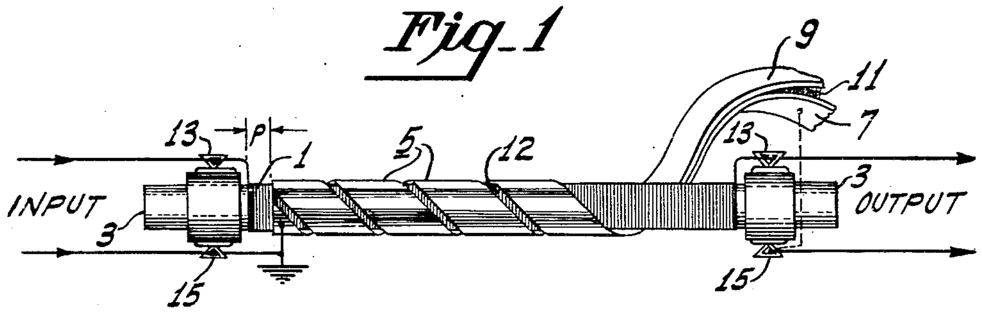

This invention relates generally to electrical delay lines and more particularly to a delay line which provides phase velocity compensation for different frequency components of signals propagated thereon.

In high-frequency systems it frequently is desirable to delay a particular signal for a definite period of time in order to allow operation of certain component apparatus of the system. This, by way of example, is true in color television transmitters and receivers wherein the monochrome component of a color signal is to be delivered in time coincidence with the color component. Since the color component passes through more extensive circuitry than does the monochrome component, a video delay line is required for suitably delaying the monochrome component of the signal.

The use of lumped constant delay lines in this and other systems is generally unsatisfactory for several reasons. The number of component parts (series inductors, shunt capacitors, etc.) are many, consequently the delay line is bulky, relatively heavy, and expensive. The design of lumped constant delay lines inherently includes a relatively low upper-cutoff frequency, and also the electrical discontinuities of the various line sections provide an irregular phase response characteristic.

Presently known compensated video delay lines are generally unsatisfactory primarily for their relative complexity and difficulty of manufacture. Some of these compensated lines require an elaborate braided outer covering for electromagnetic shielding of the line. Other delay lines require a large number of finely divided metallic particles in the structure thereof for providing the necessary phase velocity compensation. Still other delay lines utilize conductively painted coil forms supporting a helical conductor. Shorted turn effect may be avoided by a longitudinal slot in the painted conductor. This type of delay line is inexpensive but the characteristics of the line are fairly difficult to control in manufacture.

For the aforementioned and other reasons it is desirable that an improved compensated time-delay line be devised which is light, strong, compact, and easily fabricated. The present invention fulfills these requirements by providing a pair of dielectrically insulated helices capacitively coupled to each other. The helix having the greater diameter serves as a shield for the delay line and the spacing between successive turns thereof is selected to provide that ratio of shunt capacity to distributed capacity for phase velocity compensation of the delay line.

Among the objects of the instant invention is to provide an improved and simplified compensated delay line. Another object of the invention is to devise a delay line which may be fabricated more easily than previous delay lines.

Another object of the invention is to provide a delay line which includes means for matching the impedance of said line to circuitry associated therewith which impedance match is effective over the entire pass band thereof.

A further object of the invention is to provide a delay line which is relatively light in weight and inexpensive to manufacture.

Figure 2:
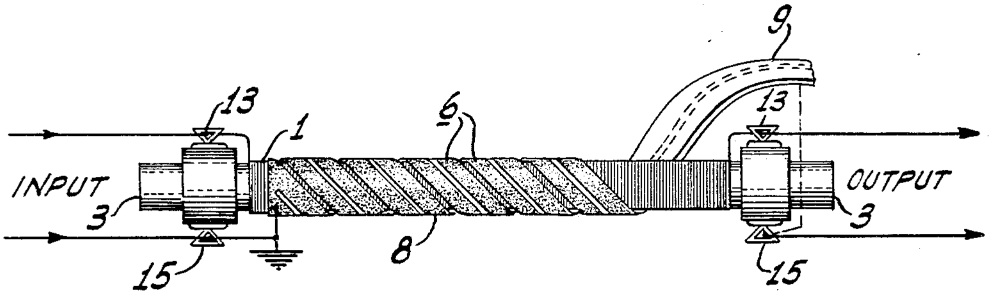

The invention will be described in greater detail with reference to the accompanying drawing in which Figure 1 is a first embodiment of a compensated delay line, according to the invention, wherein a conductive foil is pressure bonded to a dielectric tape, and Figure 2 is a second embodiment of a compensated delay line, according to the invention, in which a conductive paint is applied to a dielectric tape.

Similar reference characters are applied to similar elements throughout the drawing.

Referring to Figure 1 of the drawing, an insulated conductor is formed into a helical coil 1 of closely wound turns which is supported on a substantially cylindrical form 3. The conductor is preferably a solid copper wire covered with a suitable insulating material, such as enamel. The cylindrical coil form 3 is preferably an insulator and may be any suitable dielectric material, for example molded resinous polyvinylidene chloride. Such a dielectric form is sufficiently rigid that the coil 1 may be machine wound thereon, yet flexible enough that it subsequently can be coiled into a small space.

A second helical coil 5 is formed from a conductive ribbon 7, such as aluminum, which coil is preferably coaxially disposed with respect to said first coil and insulated therefrom by a dielectric tape 9. This dielectric tape may be of polyvinylidene chloride. In a preferred method of fabricating the herein disclosed and claimed delay line, the conductive ribbon 7 is pressure bonded to the dielectric tape 9 by means of a pressure sensitive adhesive material 11. The laminated ribbon thus formed may be helically wound about the first helix 1 in a unitary operation. The spacing 12 between successive turns of this second coil is selected to provide that value of shunt capacity between the two coils 1 and 5 which, together with the distributed capacity of the first coil 1, provides phase velocity compensation for different frequency components of signals propagated along the delay line. A pair of terminal lugs 13 and 15 are provided at each end of the coils 1 and 5 for connecting the delay line to circuitry associated therewith.

An important advantage of the present invention resides in its relative simplicity and ease of fabrication. If, during manufacture, the wire size of the first helix 1 or the size of the dielectric coil form 3 is changed, only the spacing 12 between successive turns of the laminated ribbon need be altered to compensate therefor. The delay line construction is such that the two helices 1 and 5 are not longitudinally coextensive. The inner helix 1 is of greater axial length than the outer, or laminated, helix 5. The portion *p* of the first helix which extends axially beyond each end of the outer helix 5 functions as an m-derived terminating section and provides the advantage of matching the delay line impedance to the impedance of the circuit or system in which it is used.

A second embodiment of the invention is illustrated with reference to Figure 2. A first helical coil is formed from an insulated conductor, as before described, and is supported by a dielectric coil form 3. The second helical coil is formed by winding a conductively painted dielectric tape 6 about the first coil. The tape 9 may again be polyvinylidene chloride. The paint 8 may be aluminum, graphite, silver, or the like. If desirable a pair of ribbons may be painted upon a single width of dielectric tape and the extremities thereof bonded together. This may be desirable from a manufacturing viewpoint.

Thus in accordance with the instant invention, a relatively simple, inexpensive, and compact compensated electrical delay line is herein disclosed and claimed. The delay line includes means for matching the line impedance to the impedance of other circuitry associated therewith at all frequencies within the pass band of the delay line. The fabrication of the delay line is relatively simple and compensation may easily be made for variation of component parameters during manufacture. The disposition of the laminated helix about the first coil also affords electromagnetic shielding thereof. The relatively light weight of the delay line may be of particular advantage for aircraft equipment applications.

What is claimed is:

1. An electrical delay line comprising, an insulated conductor formed into a first helical coil of closely wound turns; a strip-shaped laminated ribbon, formed of a discrete layer of dielectric material and a discrete layer of conductive material, wound upon said first coil with the dielectric layer thereof adjacent said first coil, said layer of conductive material forming a second coil having a predetermined spacing between successive turns thereof, said first coil extending in axial direction a predetermined distance beyond the respective ends of said second coil, the difference in relative axial lengths of said coils providing means for matching the impedance of said delay line to circuitry associated therewith at frequencies within the bandpass of said delay line.

2. An electrical delay line as set forth in claim 1, wherein said laminated ribbon comprises said layer of conductive material pressure bonded to said layer of dielectric material.

3. An electrical delay line as claimed in claim 1 wherein said laminated ribbon comprises a continuous strip of conductive material adhesively bonded to a dielectric tape, said tape insulating said conductive material from said first helical coil.

4. An electrical delay line as claimed in claim 1 wherein said laminated ribbon comprises a conductive material painted upon a dielectric tape, said tape insulating said conductive material from said first helical coil.

References Cited in the file of this patent

UNITED STATES PATENTS

| | | |
|---|---|---|
| 2,387,783 | Tawney | Oct. 30, 1945 |
| 2,416,683 | Finch et al. | Mar. 4, 1947 |
| 2,420,559 | Nelson | May 13, 1947 |
| 2,611,040 | Brunetti | Sept. 16, 1952 |